United States Patent [19]

Montgomery

[11] Patent Number: 4,707,920

[45] Date of Patent: * Nov. 24, 1987

[54] KNIFE WITH RETRACTABLE POINT PROTECTOR

[76] Inventor: Calvin W. Montgomery, 7 Baynard Cove Rd., Hilton Head, S.C. 29928

[ * ] Notice: The portion of the term of this patent subsequent to Aug. 26, 2003 has been disclaimed.

[21] Appl. No.: 872,025

[22] Filed: Jun. 9, 1986

Related U.S. Application Data

[63] Continuation-in-part of Ser. No. 694,329, Jan. 24, 1985, Pat. No. 4,607,432.

[51] Int. Cl.⁴ ............................................. B26B 29/00
[52] U.S. Cl. ........................................ 30/294; 17/21; 128/305

[58] Field of Search .................. 30/289, 293, 294; 128/305; 17/20, 21

[56] References Cited

U.S. PATENT DOCUMENTS 2,906,021  9/1959  Cromoga .............................. 30/293

Primary Examiner—Douglas D. Watts
Attorney, Agent, or Firm—Fleit, Jacobson, Cohn & Price

[57] ABSTRACT

The retractable point protector of the present invention is used in combination with a knife blade. The knife blade is either made of a single piece of stainless steel with its handle or is of a folding knife type which folds into its handle. The retractable point protector is journalled in the handle to pivot from a rest position to an extended position about an axis extending perpendicular to the longitudinal axis of the knife and its handle.

12 Claims, 15 Drawing Figures

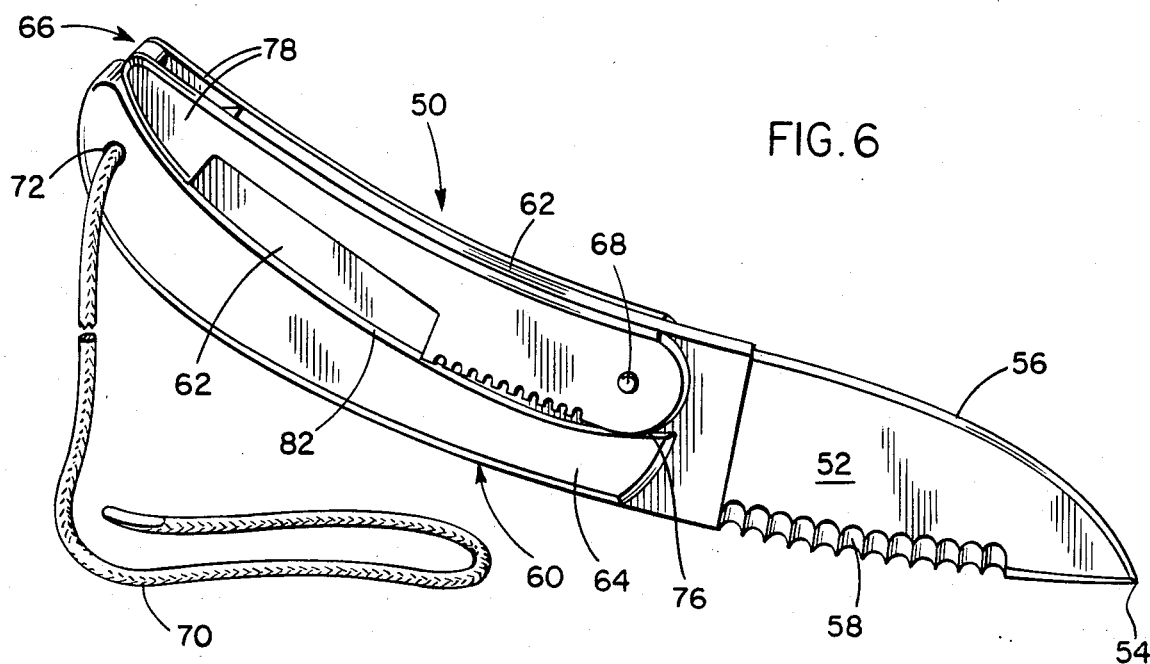
FIG. 6
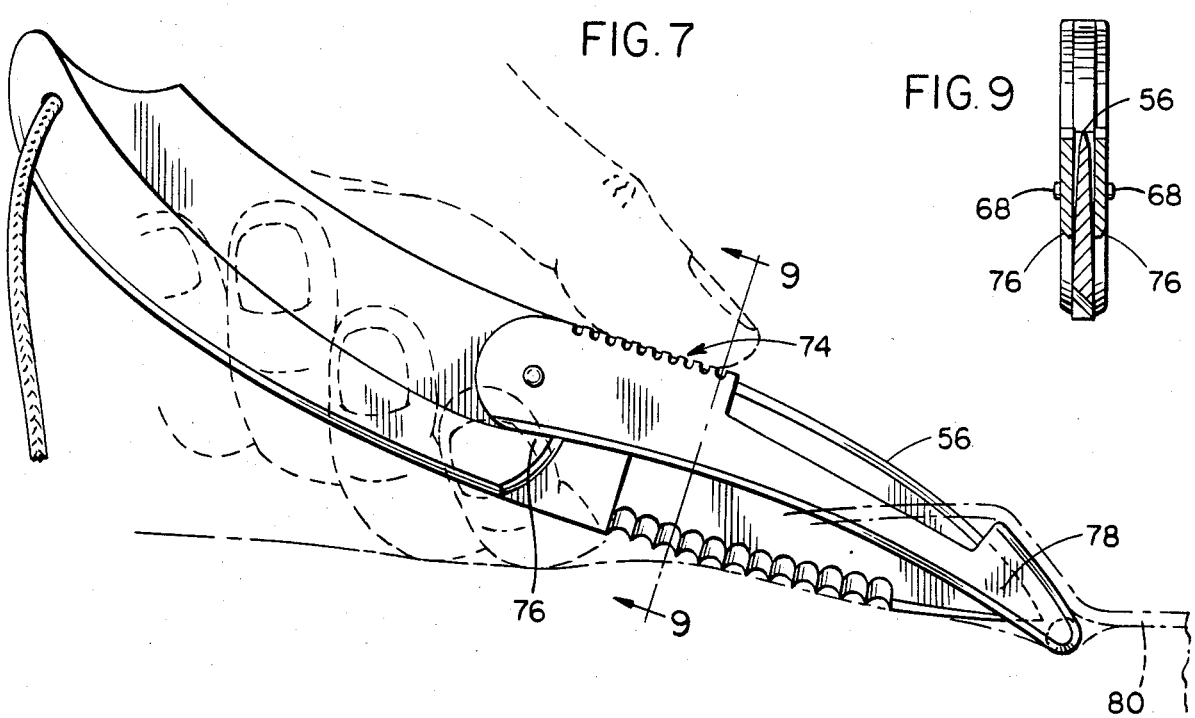
FIG. 7
FIG. 9
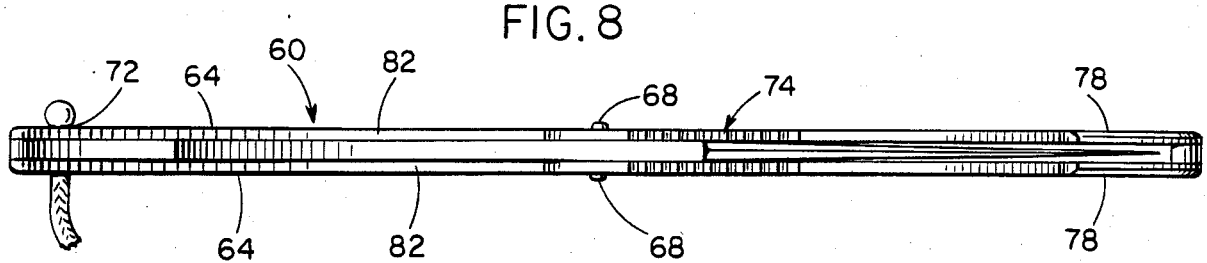
FIG. 8

KNIFE WITH RETRACTABLE POINT PROTECTOR

This application is a continuation-in-part of patent application Ser. No. 694,329, filed Jan. 24, 1985, now U.S. Pat. No. 4,607,432.

BACKGROUND OF THE INVENTION

Field dressing of an animal is the procedure performed by a hunter to remove the entrails and skin from an animal without spoiling the meat. To field dress an animal, the animal is laid on its side or, if possible, on its back, so that the hunter has access to the underside of the animal.

One method of field dressing includes the use of a single blade hunting knife. An incision is first made by the point of the knife through the skin and abdominal wall of the animal and then the skin of the animal is cut from the crotch to the throat by the blade of the hunting knife. Extreme care must be exercised so as not to puncture the intestines or the stomach of the animal with the point of the knife since this would spoil the meat and hide of the animal.

To avoid the accidental cutting of the entrails of the animal, an experienced hunter, with one hand, forms an incision through the skin of the animal in the crotch area with the point of a knife. As the blade of the knife is moved away from the hunter, the incision made in the crotch area is extended to the throat of the animal. The other hand of the hunter is placed below and slightly in front of the point of the blade of the knife to push away the entrails of the animal to avoid the entrails from being cut by the point of the hunting knife. This is a relatively slow process and is usually only performed correctly by experienced hunters.

Another method of field dressing an animal is by the use of a multi-blade knife which includes a pointed hunting knife blade and a field dressing knife blade, used independently of one another. The field dressing blade includes a blunted point and a sharp cutting edge. The multi-blade knife is used by first outwardly unfolding the pointed hunting knife blade from the handle and making an incision in the animal in the crotch area. Then, the hunting knife blade is folded inwardly into the knife handle. The field dressing blade is then unfolded outwardly from the handle and used to field dress the animal. The blunted point of the field-dressing blade separates the hide from the meat of the animal without cutting the entrails of the animal. The sharp cutting edge of the field dressing knife blade cuts the skin of the animal.

Still another method of field dressing an animal includes the use of a "Wyoming" knife. The "Wyoming" knife is a single blade, "U" shape knife, made of surgical steel. One end of the "U" is secured to a handle and the other end terminates in a dulled point. The cutting blade is similar to a single edge razor and is replaced when dull. An incision is made in the throat area prior to the use of the "Wyoming" knife, by another shape edged knife blade. The dulled knife point of the "Wyoming" knife is oriented towards the hunter and the cutting action is performed, after the incision has been made by another knife blade, by pulling the "Wyoming" knife towards the hunter. As the "Wyoming" knife is pulled from the throat to the crotch of the animal, the dulled point of the "Wyoming" knife rides under the skin of the animal, pulling up the skin of the animal in advance of the cutting blade.

The "Wyoming" knife requires replacement of its blade after a relatively short period of time. The blade is removed from the handle by the unscrewing of two screws which secure the blade to the handle. The screws are removed by a screwdriver or a coin. Extra blades are usually carried with the "Wyoming" knife due to the required replacement of the blade after periods of use.

The present invention overcomes all the disadvantages of the previously known methods of eviscerating and skinning an animal.

SUMMARY OF THE INVENTION

The retractable point protector of the present invention is used in combination with a knife blade. The knife blade is either made of a single piece of stainless steel with its handle or is of a folding knife type which folds into its handle. The retractable point protector is journalled in the handle to pivot from a rest position to an extended position about an axis extending perpendicular to the longitudinal axis of the knife and its handle. In the rest or retracted position, the point protector is located within the handle of the knife blade. In the extended position, two sides of the point protector extend parallel to the knife blade on opposite sides of the knife blade and prevent an object from coming in contact with the point of the knife blade. The point protector specifically protects the point of the knife blade from contacting the entrails or skin of an animal during field dressing.

Another use of the point protector is for cutting the clothing of an accident victim to gain access to a wound or cutting through seat belts to gain access to a victim, all without fear of cutting the victim. The point protector lifts the clothing away from the wound area as the blade cuts through the clothing.

The retractable point protector of the present invention has the following advantages over the prior art:
(1) in the retracted position of the point protector and the extended position of the knife blade, the knife blade is available for normal everyday use;
(2) no tools are required to locate the retractable point protector in its operative position on both sides of the knife blade;
(3) the knife blade is accessible and is therefore resharpenable easier than a field dressing blade having a blunt point or a "Wyoming" knife;
(4) no extra blades are required to be carried for replacement of dull blades, as is required for the "Wyoming" knife;
(5) the knife of the present invention includes only one blade for field dressing an animal, instead of the two knife blades of a multi-blade knife or a second blade which is used with a "Wyoming" knife to form the initial incision; and
(6) the knife of the present invention is easier to clean up than a multi-blade knife or "Wyoming" knife since all its parts are exposed.

It is an object of the present invention to provide a knife having a single knife blade for making an incision and a retractable point protector to protect a point of the blade.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 6 is a side view of a knife with a retracted point protector.

FIG. 7 is a side view showing in use the knife shown in FIG. 6.

FIG. 8 is a plan view of the knife shown in FIG. 6 with the point protector in an extended position.

FIG. 9 is a sectional view taken along the line 9—9 shown in FIG. 7.

DETAILED DESCRIPTION OF THE PREFERRED EMBODIMENTS

Figure 1:
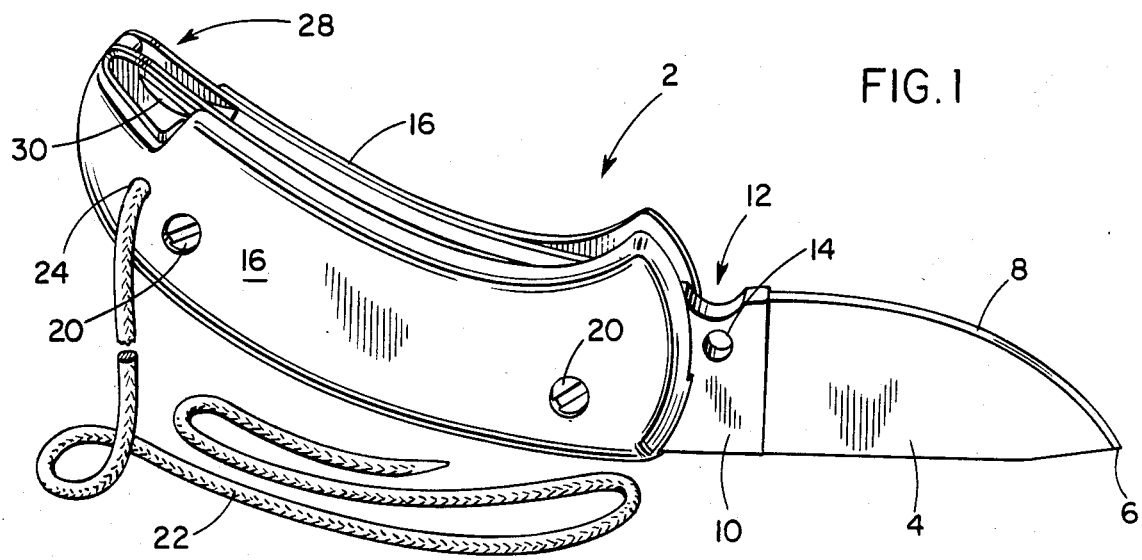
FIG. 1 is a perspective view of a knife with a retracted point protector.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

In FIG. 1, knife 2 is shown including blade 4 having point 6 and cutting edge 8. In the tang 10 of the blade 4 is defined a recess 12 and a cylindrical hole 14. The steel in the knife is 440-A and is hardened to about 55–56 Rc.

The blade 4 and tang 10 are integral with a handle portion 18 which is housed within hard rubber housing sections 16 made from elastomer AR TM. The sections 16 are heat resistant, weather resistant, and have good elasticity and flexibility. The housing sections provide a secure grip on the knife. The sections 16 may be made of any color, preferably a bright hunter's orange for easy identification in the field.

The housing sections 16 are secured to the handle portion 18 of knife blade 4 and tang 10 by screws 20 which are located on both sides of the handle portion 18. A cord 22 extends through a hole 24 and is knotted on one side of the knife handle as shown at 26. The cord is of any suitable material such as a parachute cord, reinforced string, or a leather strip.

In FIG. 1, one end portion of retractable point protector 28 is shown extending through a recess defined in the housing sections 16. A thumbnail groove 30 is defined in one of the two sides of the retractable point protector for lifting of the retractable point protector from the handle.

Figure 2:
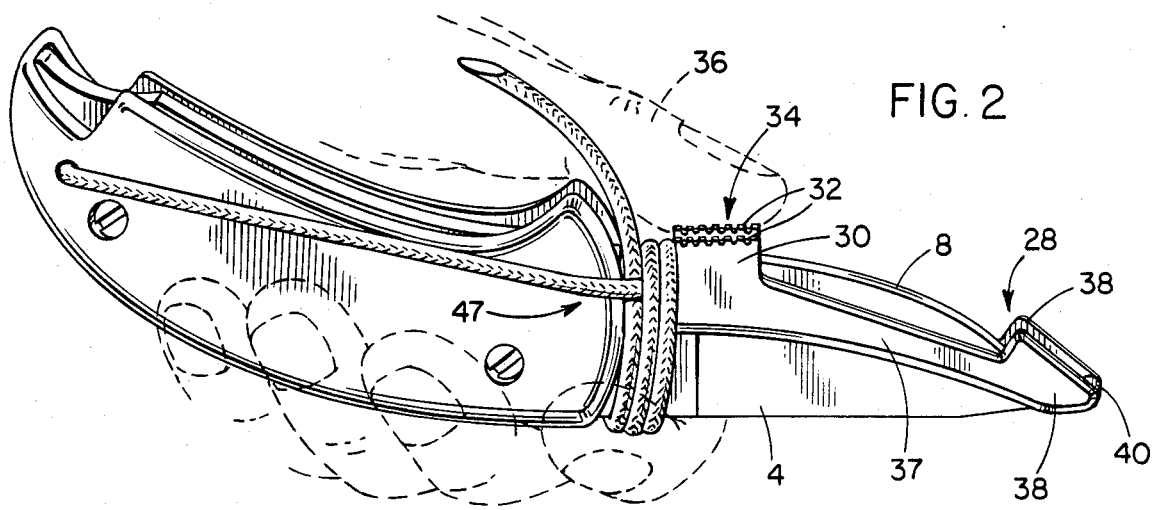
FIG. 2 is a side view of a knife with a point protector shown fixed in an extended position.

In FIG. 2, the retractable point protector 28 is shown in its extended position. The point protector includes two shank side portions 37 which each include a projection 30 having a plurality of grooves 32 which are aligned with the opposite side portion to define a thumb rest 34. The thumb rest 34 prevents the thumb 36 of an operator from sliding past the thumb rest and into engagement with the cutting edge 8 of the blade 4.

Further downstream from the thumb rest 34 are shank portions 38 which terminate in point protector sections 38. The two point protection sections 38 are connected by a spacing bar 40. The spacing bar spaces the two lateral sections 37 over a distance greater than the width of the blade 4 so that the blade 4 can be located between the two side sections of the point protector.

Figure 4:
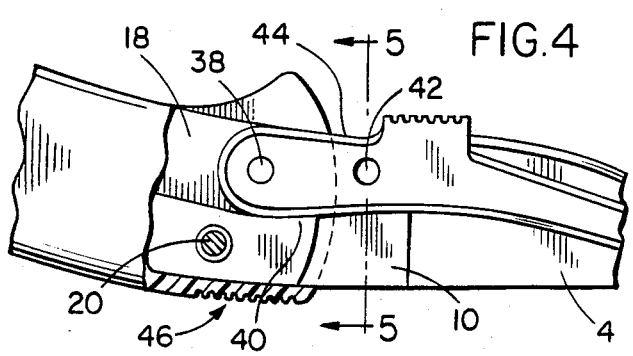
FIG. 4 is a partial section cutaway view of a knife with an extended point protector.
Figure 5:
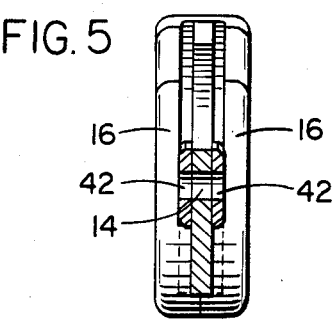
FIG. 5 is a sectional view taken along the line 5—5 shown in FIG. 4.

In the extended position, the point protector 28 protects the point 6 of the blade 4 from encountering an object while exposing a portion of the cutting edge 8. The point protector 28 is shown in FIG. 4 after being rotated about a shaft 38 which is defined by handle portion 18. An abutment portion 40 prevents continued travel of the point protector in a direction from its retracted position to its extended position.

In the extended position of the point protector, a hole 42 defined by both of the sides of the point protector is aligned with the hole 14 in the tang 10 of the blade 4. In this position, the free end of the cord 22 is inserted through the holes 42 and 14 and pulled taut. The cord is then wrapped around the knife and in the point protector recess 44 and recess 12 of the tang 10, in loops which extend towards the handle of the knife.

As shown in FIG. 2, the cord is wrapped once, twice and on a third loop the free end of the cord is pushed under cord portion 47 and pulled into a space between the second coil and the edge of the knife handle. The cord 22 thereby locks the point protector in position on either side of the blade.

Figure 3:
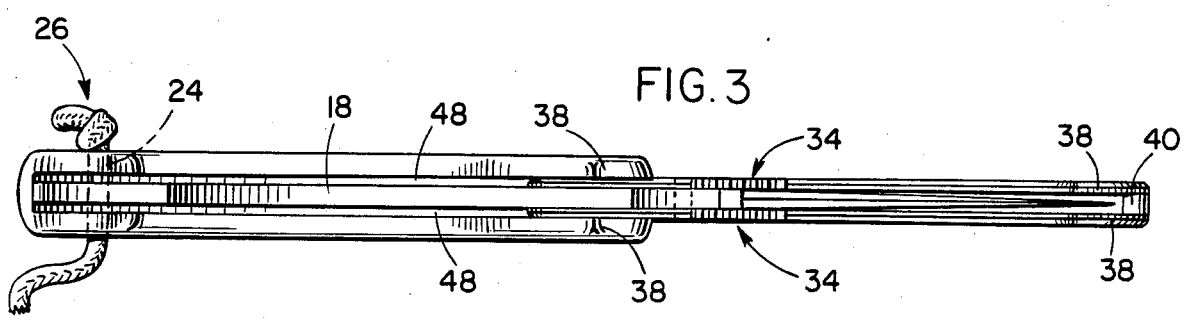
FIG. 3 is a plan view of a knife with an extended point protector.

In FIG. 4, an anti-slip finger rest 46 is shown which is defined by a series of ridges formed in a bottom surface of the housing portions 16. In FIG. 3, recesses 48 are shown which are defined on opposite sides of the handle 18 for locating of the opposite side portions of the point protector in its retracted position.

In FIG. 6, knife 50 is shown including blade 52 having point 54. Blade 52 includes a cutting edge 56 on one side of the blade and a serrated edge 58 on the opposite side of the blade. Serrated edge 58 is for cleaning of fish, cutting of branches, cutting of small trees or slashing through rope. Handle portion 60 includes a central portion 62 and two side portions 64.

A retractable point protector 66 is shown in a retracted position in FIG. 6. The point protector pivots about shaft 68 which extends through both sides of the point protector. A cord 70 is fit through a hole 72 which extends through a rear end of the handle 60. The cord is used to tie the knife in a holster or holder for the knife.

Knife 50 is shown in use in FIG. 7. The point protector 66 is shown in an extended position, after being pivoted about shaft 68. A thumb grip 74 is thereby exposed for the thumb of an operator to press down on the point protector to force the point protector against a rest stop 76 defined by a forward edge of each side handle portion 64.

In FIG. 7, hooked end 78 of each of the two sides of the point protector protect the point from engaging the entrails of an animal being skinned. The skin 80 of the animal is lifted by the hook shape portion 78 as the knife is moved away from the operator. The skin 80 is cut by the cutting edge 56 as the knife is moved in a forward direction away from the operator.

In the retracted position, the point protector lies within a recess defined between the side portion 64 and central portion 62. The width of the ledge 82 is substantially equal to the width of the point protector so that a flush-like appearance appears for the knife handle when the point protector is retracted.

Figure 10:
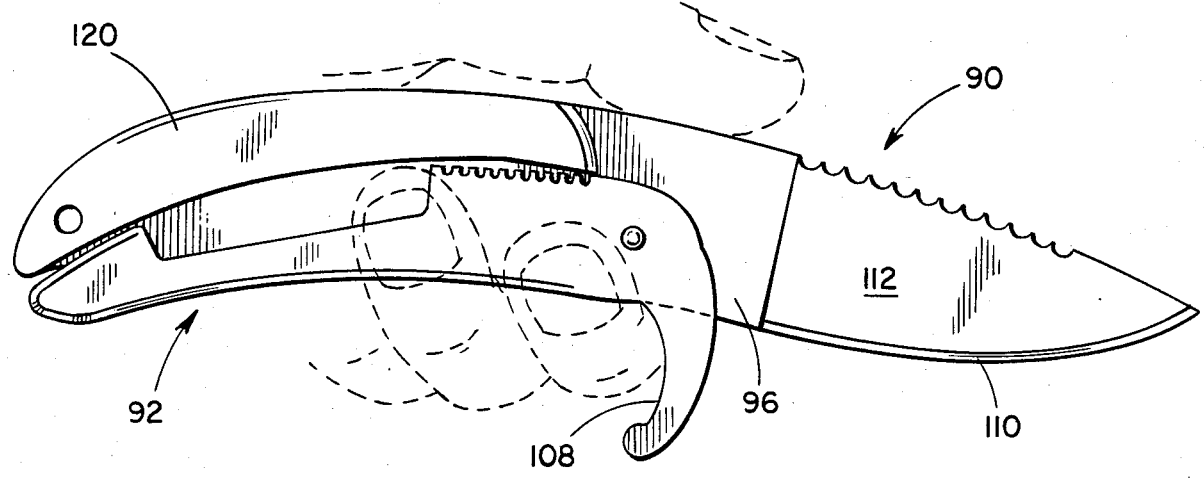
FIG. 10 is a side view of a knife with a retracted point protector.
Figure 11:
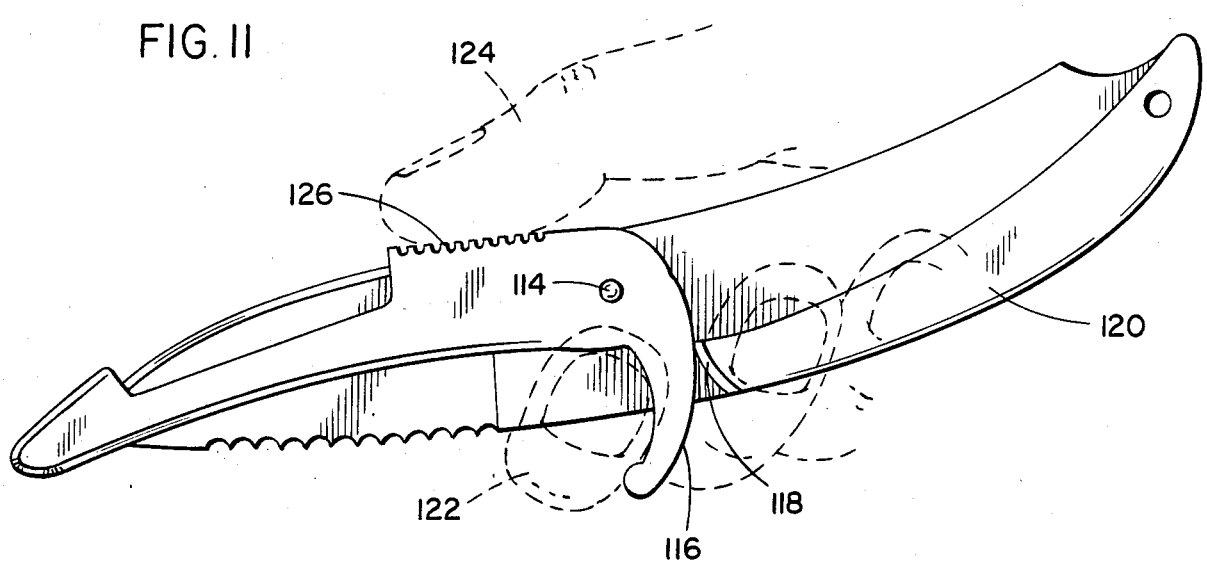
FIG. 11 is a side view of a knife with an extended point protector.
Figure 12:
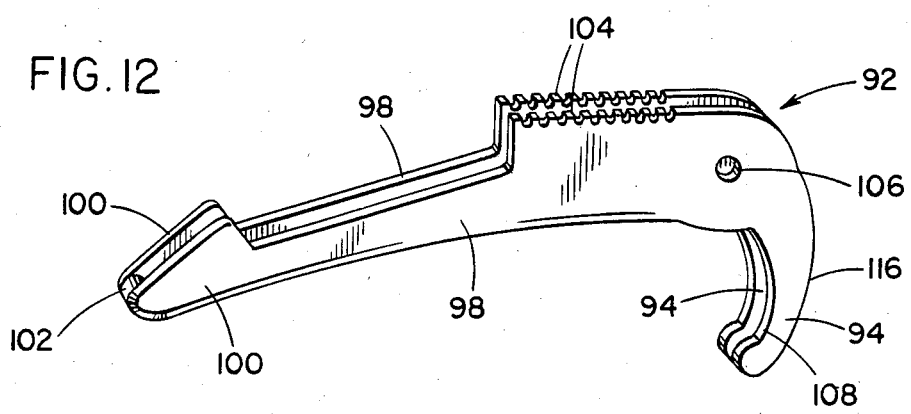
FIG. 12 is a side view of the point protector shown in FIG. 11, separated from the knife.

In FIG. 10, a knife 90 similar to knife 50 shown in FIG. 6 is shown. In FIG. 10, the retractable point protector 92, as shown in FIG. 12, includes a combined finger guard and finger rest 94 located on both sides of the central handle portion 96. The point protector 92 includes two side portions 98 and two hooked end portions 100 which are spaced apart by bar 102. In addition, thumb rest grooves 104 and opening 106 are shown.

In the retracted position of the point protector shown in FIG. 10 an edge 108 serves to protect the fingers of the operator from slipping forward onto the cutting edge 110 of the blade 112 during a normal cutting operation.

In the extended position of the point protector, the point protector is rotated about shaft 114 which is journalled in hole 106 until an edge 116 of the guard 94 contacts an edge 118 of handle side portions 120. In this position, the forefinger 122 grasps the edge 108 of the finger guard 94 as the thumb 124 presses down on the thumb rest 126. A secure locking in position of the point protector results.

Figure 13:
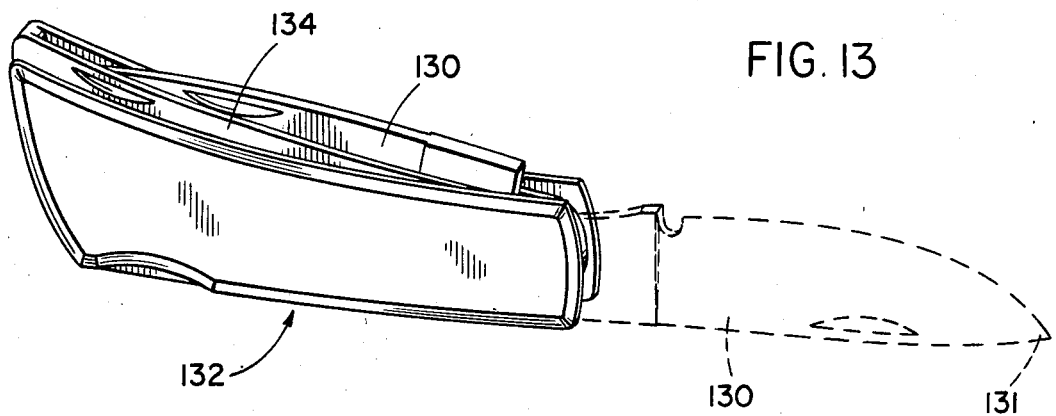
FIG. 13 is a side view of a folding knife with a retracted blade and a retracted point protector.

In FIG. 13, a folding knife is shown having a blade 130 shown in a retracted position in solid lines and in an extended position in dotted lines. The blade 130 rests within a handle 132 until extended for use.

Figure 14:
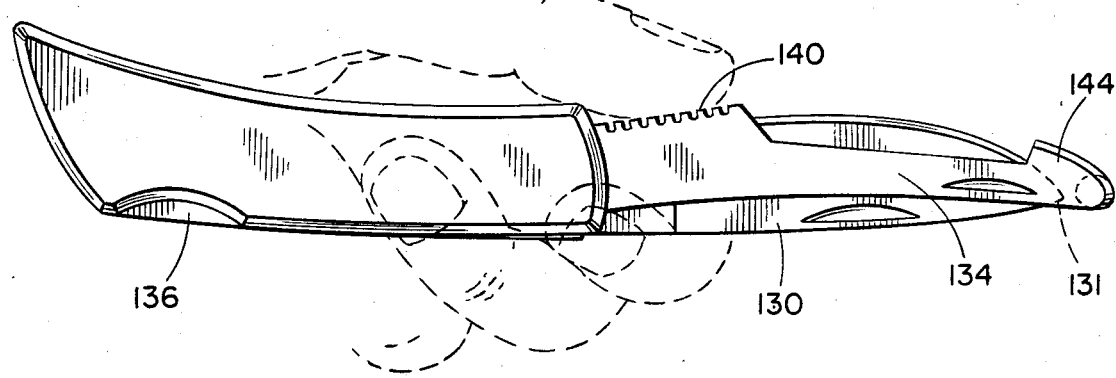
FIG. 14 is a side view of a folding knife with an extended blade and an extended point protector.

In FIG. 14, blade 130 is shown in the extended position and a retractable point protector 134 is also shown in an extended position. The point protector is shown in the retracted position in FIG. 13. The blade 130 in the extended position is locked in place and is only retracted after release by release button 136 of a biased cam.

Figure 15:
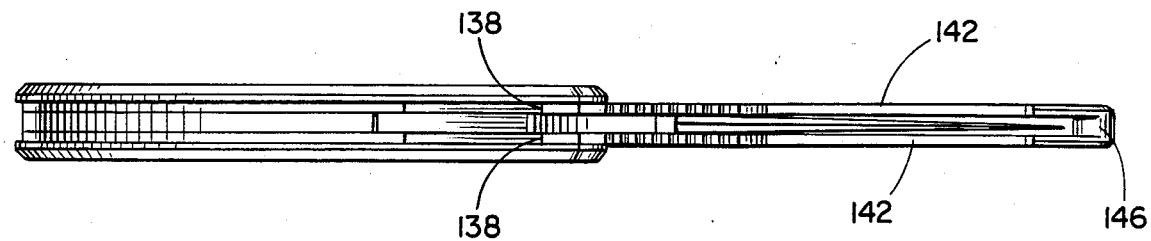
FIG. 15 is a plan view of the knife shown in FIG. 14 with an extended blade and extended point protector.

The point protector is freely movable between its retracted position and its extended position until engaging a stop edge 138 as shown in FIG. 15. The thumb rest 140 is formed by a series of grooves which prevent the sliding of the thumb in a forward direction during a cutting operation.

As in the other figures, the point protector 134 includes two side portions 142, terminating at hook portions 144. Spacer bar 146 separates the two side portions from each other. On extension of both the knife blade and the point protector, point 131 is protected from engaging with an object during a cutting operation.

Protection of the point is ideal for the cutting away of clothing during a medical emergency without fear of contacting the victim with the point of the blade. In addition, the folding pocket knife may also be used in a gutting operation for the cutting of the skin of an animal without the point contacting the internal organs of the animal.

Having described the invention, many modifications thereto will become apparent to those skilled in the art to which it pertains without deviation from the spirit of the invention as defined by the scope of the appended claims.

I claim:

1. A cutting device comprising:
    a knife having a blade and a handle, said blade including a cutting edge and a point,
    point protector means pivotally mounted on said handle for preventing contact with said point when said cutting edge is moved away from an operator in a cutting operation,
    stop means defined by said handle for locating said point protector means to prevent contact with said point,
    said point protector means and said knife including securing means for securing said point protector means in position with respect to said blade,
    said securing means including a first hole defined by said point protector means, a second hole defined by said knife and cord means passing through said first hole and said second hole for preventing said point protector means from moving relative to said blade.

2. A cutting device in accordance with claim 1, wherein said point protector means includes a thumb rest for preventing sliding of a thumb of the operator onto said cutting edge.

3. A cutting devise in accordance with claim 1, wherein said point protector means includes a thumb rest for preventing sliding of a thumb of the operator onto said cutting edge.

4. A cutting device in accordance with claim 1, wherein said handle includes a recess for storage of said point protector means.

5. A cutting device comprising:
    a knife having a blade and a handle, said blade including a cutting edge and a point,
    point protector means pivotally mounted on said handle for preventing contact with said point when said cutting edge is moved away from an operator in a cutting operation,
    stop means defined by said handle for locating said point protector means to prevent contact with said point,
    said point protector including a projection for aiding in holding said point protector means in an extended position and for preventing sliding of the hand of the operator onto said cutting edge when said point protector means is in a retracted position, and
    said point protector means includes a thumb rest for preventing sliding of a thumb of the operator onto said cutting edge.

6. A cutting device in accordance with claim 5, wherein said point protector means and said knife include securing means for securing said point protector means in position with respect to said blade.

7. A cutting devise in accordance with claim 5, wherein said handle includes a recess for storage of said point protector means.

8. A folding knife comprising:
    a handle,
    a blade pivotably mounted on said handle to move between an extended position and a retracted position, and
    a point protector pivotably mounted on said handle to move between an extended position and a retracted position, said point protector extending along and adjacent to said blade and around a point of said blade to prevent said point from cutting when both said blade and said point protector are in their respective extended positions and when both said blade and said point protector are in their respective retracted positions.

9. A folding knife as claimed in claim 8, wherein said blade and said point protector are pivotably mounted on the same axis.

10. A folding knife as claimed in claim 9, wherein said point protector includes a thumb rest for preventing sliding of a thumb onto said blade.

11. A folding knife as claimed in claim 8, wherein said point protector is located on opposite sides of said blade.

12. A folding knife comprising:
 a handle,
 a blade having two ends, one end having a point and the other end mounted on said handle so that said blade moves between a first position lying at least partially within said handle and a second position where said one end extends in a direction opposite to a direction in which said one end extends in said first position, and
 a point protector pivotably mounted on said handle to move between a first position lying between a portion of said handle and said blade when said blade is in its first position and a second position for said point protector where said point protector extends along and adjacent to said blade and around said point to prevent said point from cutting when said blade is in its second position.

* * * * *